(12) United States Patent
Toyama et al.

(10) Patent No.: US 9,950,663 B2
(45) Date of Patent: Apr. 24, 2018

(54) ELECTRONIC VEHICLE HORN

(71) Applicant: IMASEN ELECTRIC INDUSTRIAL CO., LTD., Inuyama-Shi (JP)

(72) Inventors: Koichi Toyama, Nagoya (JP); Toshihiko Kawamura, Nagoya (JP); Takashi Yamada, Nagoya (JP)

(73) Assignee: IMASEN ELECTRIC INDUSTRIAL CO., LTD., Inuyama-Shi (JP)

( * ) Notice: Subject to any disclaimer, the term of this patent is extended or adjusted under 35 U.S.C. 154(b) by 0 days.

(21) Appl. No.: 15/220,557

(22) Filed: Jul. 27, 2016

(65) Prior Publication Data

US 2017/0028910 A1 Feb. 2, 2017

(30) Foreign Application Priority Data

Jul. 28, 2015 (JP) .................................. 2015-148241

(51) Int. Cl.
| | |
|---|---|
| *H04B 1/00* | (2006.01) |
| *B60Q 5/00* | (2006.01) |
| *H04R 17/00* | (2006.01) |
| *G10K 9/122* | (2006.01) |
| *H04R 17/10* | (2006.01) |
| *B06B 1/06* | (2006.01) |

(52) U.S. Cl.
CPC .............. *B60Q 5/00* (2013.01); *G10K 9/122* (2013.01); *H04R 17/00* (2013.01); *B06B 1/06* (2013.01); *H04R 17/10* (2013.01); *H04R 2420/01* (2013.01); *H04R 2499/13* (2013.01)

(58) Field of Classification Search
USPC ...................................................... 116/59, 24
See application file for complete search history.

(56) References Cited

U.S. PATENT DOCUMENTS

| | | | | |
|---|---|---|---|---|
| 5,012,221 A | * | 4/1991 | Neuhaus .................. | G08B 3/10 340/329 |
| 5,293,149 A | | 3/1994 | Wilson et al. | |
| 8,598,997 B2 | * | 12/2013 | Hayashi ................. | B60Q 5/008 116/137 R |
| 2003/0228021 A1 | * | 12/2003 | Letinturier ............... | G08B 3/10 381/86 |

(Continued)

FOREIGN PATENT DOCUMENTS

| | | |
|---|---|---|
| JP | S5713490 A | 1/1982 |
| JP | S58162994 A | 9/1983 |
| JP | H10207466 A | 8/1998 |

(Continued)

*Primary Examiner* — Brent Swarthout
(74) *Attorney, Agent, or Firm* — J-TEK LAW PLLC; Jeffrey D. Tekanic; Scott T. Wakeman

(57) ABSTRACT

An electronic vehicle horn outputs a warning sound by exciting a diaphragm using a piezoelectric device that is driven with a composite signal generated, in part, by modulating a first fundamental square wave with a first modulating square wave and setting a frequency deviation at the time of the modulation in a predetermined range, modulating a second fundamental square wave with a second modulating square wave and setting a frequency deviation at the time of the modulation in a predetermined range, and generating the composite signal by mixing the modulated first fundamental square wave and the modulated second fundamental square wave.

20 Claims, 6 Drawing Sheets

(56) References Cited

U.S. PATENT DOCUMENTS

2008/0180230 A1    7/2008  Zimmermann
2013/0093578 A1*   4/2013  Goto .................. G10K 9/122
                                                340/425.5

FOREIGN PATENT DOCUMENTS

| WO | 2015145659 A1 | 10/2015 |
| WO | 2015167572 A1 | 11/2015 |
| WO | 2015186239 A1 | 12/2015 |

* cited by examiner

ELECTRONIC VEHICLE HORN

CROSS-REFERENCE

This application claims priority to Japanese patent application no. 2015-148241 filed on Jul. 28, 2015, the contents of which are incorporated by reference as if fully set forth herein.

TECHNICAL FIELD

The present invention generally relates to an electronic vehicle horn.

BACKGROUND ART

To improve the tone quality (timbre) of a vehicle horn, in the past two planar electromagnetic vehicle horns for a high-pitched sound and a low-pitched sound have been provided, and a consonance is generated from the high-pitched and low-pitched sounds. However, such conventional vehicle horns necessitate a double-wide installation space and also extra manufacturing costs to provide the two separate horns. In view of this circumstance, Japanese Laid-Open Patent Publication No. S58-162994 proposed a structure in which a small-size vehicle horn having a smaller outer diameter than the planar vehicle horn is provided in front of the planar vehicle horn.

SUMMARY

However, even in the structure described in JP S58-162994, a compact size in the front-rear direction can not be achieved and it is still relatively expensive to manufacture because two horns must be provided.

It is therefore an object of the present teachings to provide an electronic vehicle horn that has a more compact shape overall, and in particular in the front-rear direction. In addition or in the alternative, another object is to achieve a significant cost reduction. In addition or in the alternative, another object is to improve the tone quality (timbre) of the warning sound emitted by the electronic vehicle horn.

According to one aspect of the present teachings, an electronic vehicle horn outputs a warning sound by using a piezoelectric device to excite a diaphragm (metal vibrating plate). A control circuit of the electronic vehicle horn may preferably include one or more of: means (circuit) for generating a first fundamental square wave for a higher-pitched sound; means (circuit) for generating a second fundamental square wave for a lower-pitched sound; means (circuit) for generating a first modulating square wave; means (circuit) for generating a second modulating square wave; means (circuit) for modulating the first fundamental square wave with the first modulating square wave and for setting a frequency deviation at the time of the modulation; means (circuit) for modulating the second fundamental square wave with the second modulating square wave and for setting a frequency deviation at the time of the modulation; and means (mixing circuit) for generating a composite signal (synthesized signal) by mixing the modulated first fundamental square wave with the modulated second fundamental square wave. A means (driver circuit) for driving the piezoelectric device (6) with the composite signal is also provided. Preferably the frequency range of each of the fundamental square waves, the frequency range of each of the modulating square waves and the frequency deviation range for each of the modulations are set such that the warning sound output by the piezoelectric device driven with the composite signal approximates (is similar to) the tone quality (timbre) of a warning sound that is output from a conventional vehicle horn, in which the diaphragm (metal plate) is driven electromagnetically.

In the above-described aspect of the present teachings, the piezoelectric device is driven with a drive signal that is generated by mixing the modulated first fundamental square wave and the modulated second fundamental square wave. As a result, the warning sound emitted from the diaphragm excited by the piezoelectric device becomes the consonance of a higher-pitched sound and a lower-pitched sound, and the tone quality is greatly improved. In addition, according to this aspect, because the consonance of the higher-pitched sound and the lower-pitched sound is generated by a single diaphragm, the overall size of the vehicle horn can be made more compact and a significant cost reduction can be realized. Furthermore, according to this aspect, by setting the frequency deviation for each of the modulations, as well as the frequencies of the fundamental square waves and the modulating square waves, within appropriate ranges, as will be described below, the tone quality (timbre) of the electronic vehicle horn is similar to (approximates) the tone quality (timbre) of conventional electromagnetic vehicle horns. Consequently, the present electronic vehicle horn can replace known electromagnetic vehicle horns with the advantages of a more compact overall shape and reduced manufacturing costs.

It is noted that the frequencies of the first and second fundamental square waves may be set between 1800 Hz and 3550 Hz, preferably between 2000 Hz and 3350 Hz. In addition or in the alternative, the frequencies of the first and second modulating square waves may be set between 290 Hz and 580 Hz, preferably between 310 Hz and 440 Hz. In addition or in the alternative, the frequency deviations relative to the frequencies of the first and second fundamental square waves, respectively, may be set between −11 dB and −25 dB, preferably between −15 dB and −21 dB.

The above-mentioned means or circuits for generating waveforms and/or processing (e.g., modulating mixing, generating drive signals, etc.) the waveforms may be implemented in hardware and/or in software and may be implemented as a single integral device (e.g., an integrated circuit) or may be implemented with two or more discrete components. Also, although square waves are described as the preferred waveforms according to the present teachings, rectangular waves also may optionally used, as appropriate.

Further objects, aspects, embodiments and advantages of the present teachings will be apparent to a person skilled in the art upon reading the following detailed description and appended claims in view of the appended Figures.

DETAILED DESCRIPTION OF PREFERRED EMBODIMENTS

It should be noted that the embodiments described below are merely examples, and various design improvements that a person skilled in the art can make without departing from the spirit of the present invention also fall within the scope of the present invention.

Figure 1:
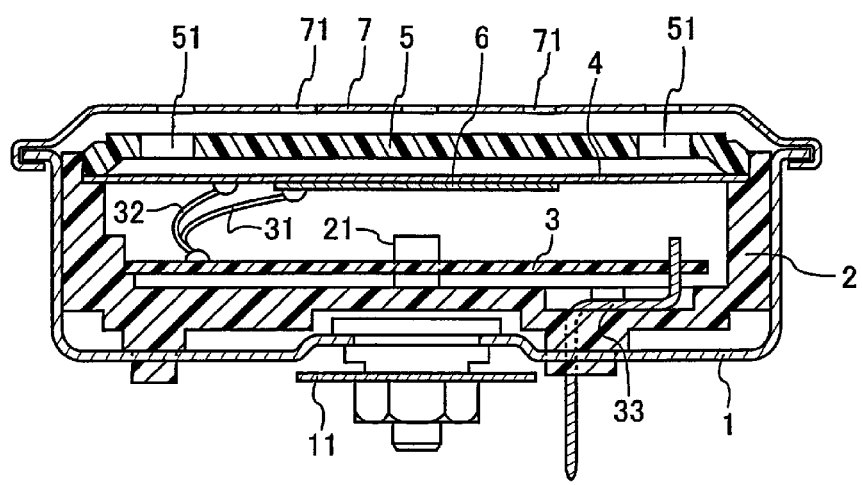
FIG. 1 is a cross-sectional view of an overall structure of an electronic vehicle horn according to the present teachings.

FIG. 1 shows a cross-sectional view of an overall structure of an electronic vehicle horn according to one representative, non-limiting example of the present teachings. The electronic vehicle horn includes a metal-plate housing 1 having a circular open vessel (container) shape. An attachment stay 11 is bolted to the center of the bottom wall of the housing 1. A resin (plastic) holder 2 having an open vessel (container) shape is inserted into the housing 1; a circuit board 3 is disposed in parallel to the bottom wall of the holder 2. The circuit board 3 is fitted onto and supported by a pin 21 that upwardly projects from the bottom wall of the holder 2, and a warning sound circuit, which is further described below, is implemented on the circuit board 3. It is noted that an illustration of the circuit components, etc. of the warning sound circuit is omitted in FIG. 1 for the sake of clarity.

A metal diaphragm plate 4 serves as a diaphragm (vibrating plate) and extends (is stretched) parallel to the circuit board 3, thereby closing the opening of the holder 2. The outer circumferential edge of the diaphragm plate 4 is sandwiched between an edge of the opening of the holder 2 and the outer circumference edge of a resin (plastic) resonator 5 that covers the opening of the holder 2. A plurality of sound output holes 51 is provided in the resonator 5 at a plurality of locations around the outer circumference thereof (in this embodiment, four locations at regular intervals in the circumferential direction). On the rear surface of the diaphragm plate 4, a circular piezoelectric device 6 is centrally attached (i.e. on the lower surface of diaphragm 4 in FIG. 1). Output wires 31, 32 respectively extend from the circuit board 3 to electrodes on the piezoelectric device 6 and on the diaphragm plate 4. Further, one end of the circuit board 3 is connected with one end of a power supply connector 33 that extends to the exterior of the housing 1. It should be noted that the upper surface of the resonator 5 is covered by a metal cover 7 that has oblong sound emission holes 71 formed therein.

Figure 2:
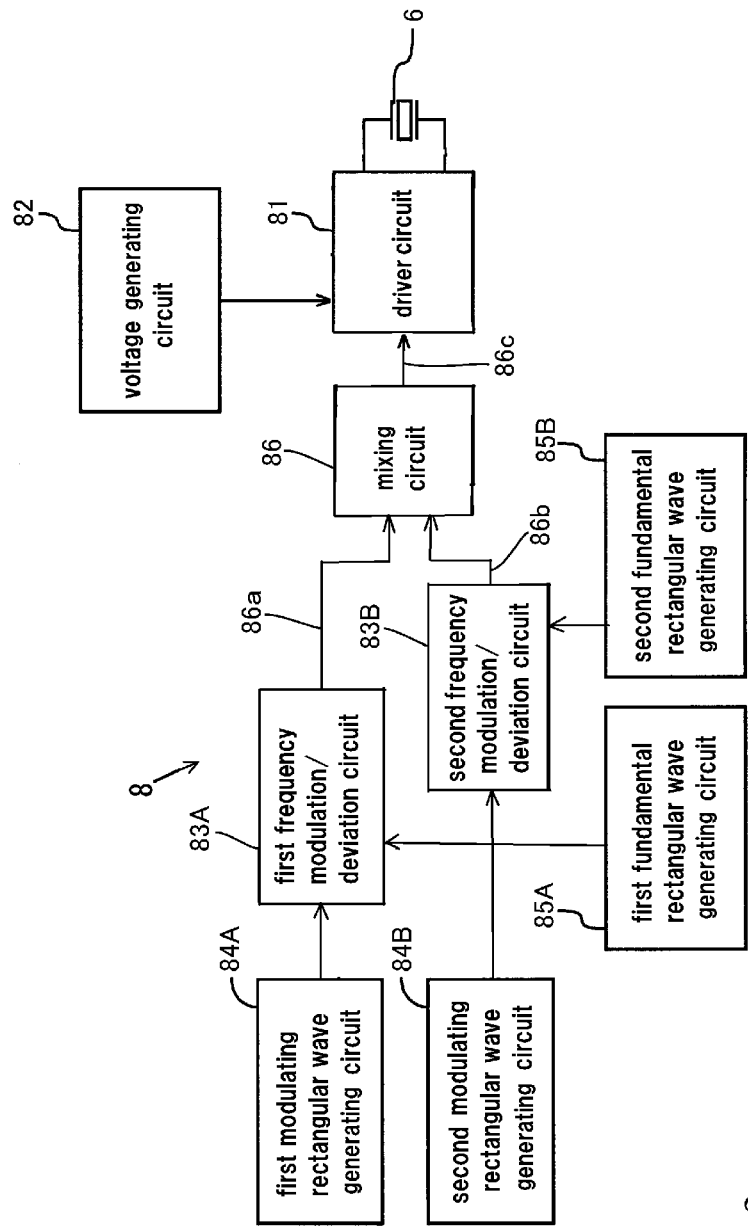
FIG. 2 is a block diagram showing the configuration of a representative, non-limiting circuit for generating a composite (drive) signal for driving a piezoelectric device and generating the warning sound.

FIG. 2 shows the configuration of a representative, non-limiting warning sound circuit 8 that may be implemented on the circuit board 3. In this embodiment, both electrodes of the piezoelectric device 6 are connected to a driver circuit 81, and a voltage is supplied from a voltage generating circuit 82 to the driver circuit 81. The driver circuit 81 is connected with a mixing circuit 86, which is connected with a first frequency modulation/deviation circuit 83A and a second frequency modulation/deviation circuit 83B. In addition, the first frequency modulation/deviation circuit 83A is connected with a first modulating square wave generating circuit 84A and a first fundamental square wave generating circuit 85A that generates a first fundamental square wave for a higher-pitched sound; the second frequency modulation/deviation circuit 83B is connected with a second modulating square wave generating circuit 84B and a second fundamental square wave generating circuit 85B that generates a second fundamental square wave for a lower-pitched sound. The fundamental square waves may also be referred to as base frequencies or nominal frequencies.

The first and second fundamental square waves, which are respectively generated in the first and second fundamental square wave generating circuits 85A, 85B, are frequency modulated with predetermined frequency deviations, which will be further described below, in the first and second frequency modulation/deviation circuits 83A, 83B, respectively, using the modulating square waves output from the first and second modulating square wave generating circuits 84A, 84B, respectively. The modulated output signals 86a, 86b are mixed (combined) in the mixing circuit (synthesis circuit) 86, and the resulting composite signal (synthesized signal) 86c is applied to the piezoelectric device 6 via the driver circuit 81, so that the piezoelectric device 6 is excited, i.e. it vibrates, thereby vibrating (deforming) the diaphragm 4 and generating the warning sound. It should be noted that the first and second frequency modulation/deviation circuits 83A, 83B, the first and second modulating square wave generating circuits 84A, 84B, the first and second fundamental square wave generating circuits 85A, 85B, and the mixing circuit 86 may be implemented in software, instead of hardware, as will be discussed below. As used herein, the term "frequency deviation" means the maximum difference between the modulated frequency (instantaneous frequency) and the fundamental frequency (the base frequency), i.e. the maximum shift away from the fundamental frequency.

Figure 3:
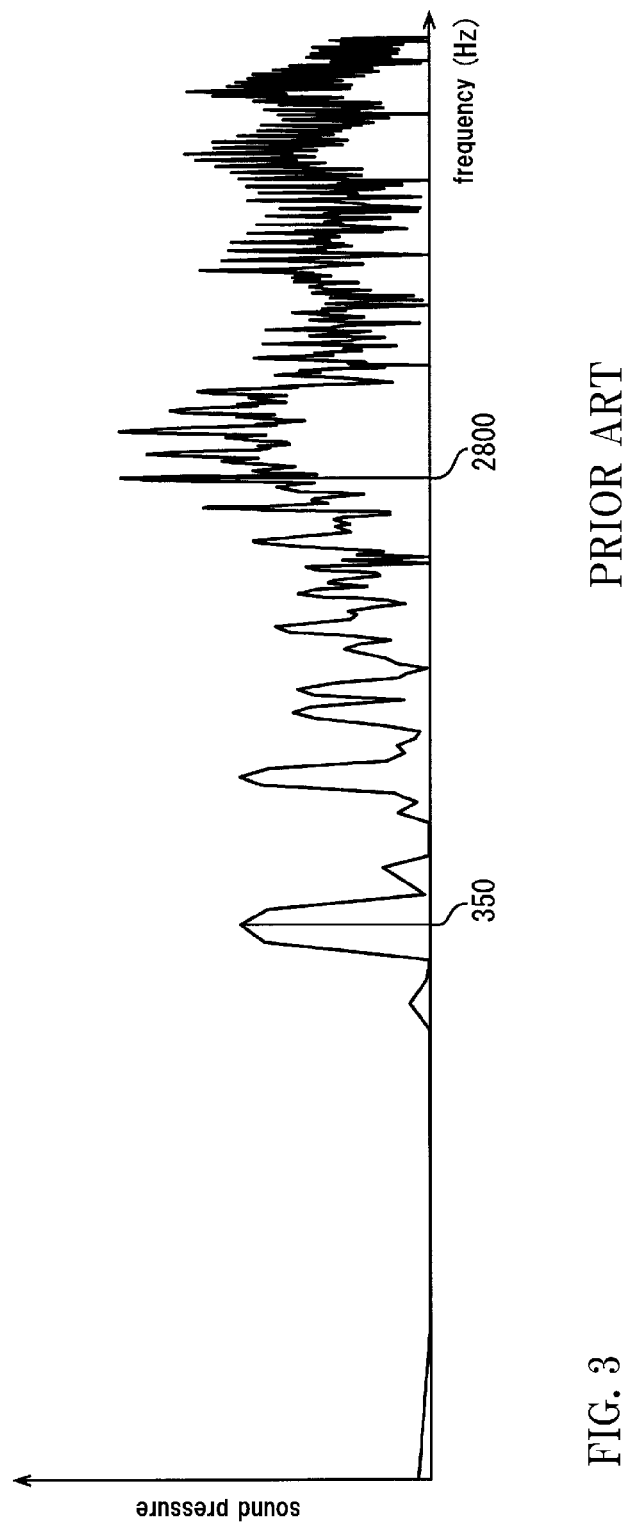
FIG. 3 is a diagram showing the frequency spectrum of a warning sound of a conventional planar electromagnetic vehicle horn for a lower-pitched sound.

In order to explain one representative example of how the first and second fundamental frequencies according to the present teachings may be selected, FIG. 3 shows an example of the frequency spectrum of the warning sound of a conventional planar electromagnetic vehicle horn for the lower-pitched sound. In the exemplary frequency spectrum shown in FIG. 3, the fundamental frequency (base frequency) of the warning sound is 350 Hz. At the eighth-order higher harmonic wave (2800 Hz) of the plurality of higher harmonic waves that have frequencies, which are integral multiples of the fundamental frequency, the resonating plate resonates, the sound pressure is maximized, and the sound pressure is in a range of 105 to 118 dB.

Figure 4:
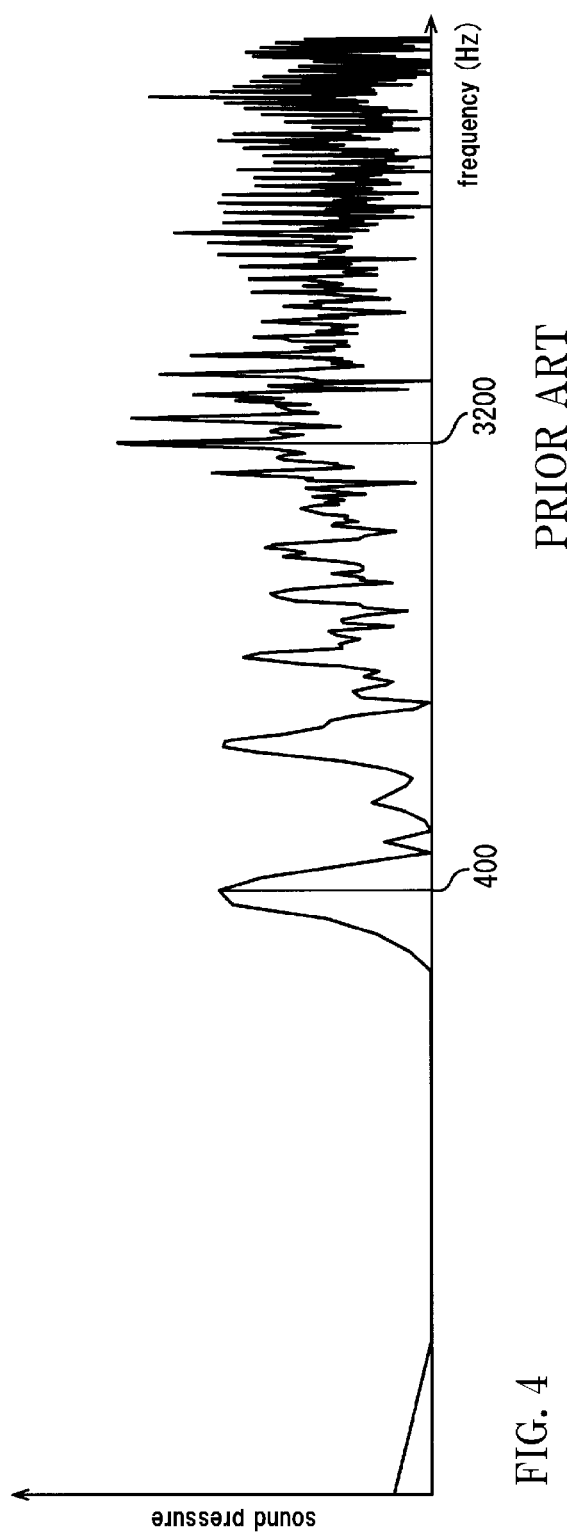
FIG. 4 is a diagram showing the frequency spectrum of a warning sound of a conventional planar electromagnetic vehicle horn for a higher-pitched sound.

Further, FIG. 4 shows an example of the frequency spectrum of the warning sound of a conventional planar electromagnetic vehicle horn for the higher-pitched sound. In the exemplary frequency spectrum shown in FIG. 4, the fundamental frequency of the warning sound is 400 Hz. At the eighth-order higher harmonic wave (3200 Hz) of the plurality of higher harmonic waves that have frequencies, which are integral multiples of the fundamental frequency, the resonating plate resonates, the sound pressure is maximized, and the sound pressure is in a range of 105 to 118 dB.

Figure 5:
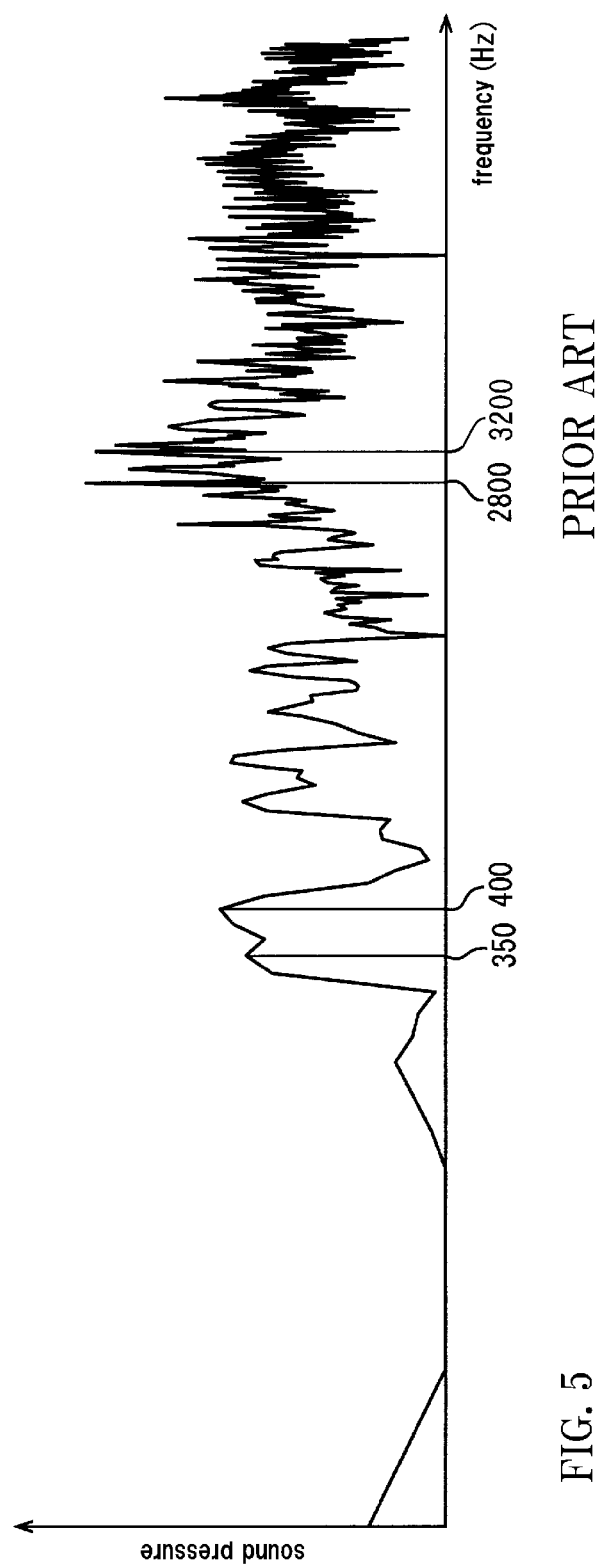
FIG. 5 is a diagram showing the frequency spectrum of the warning sound when the lower-pitched sound and the higher-pitched sound are emitted simultaneously from the conventional planar electromagnetic vehicle horn.

Furthermore, as shown in FIG. 5, the combined frequency spectrum of the warning sound when the above-described lower-pitched sound and the higher-pitched sound are emitted simultaneously by the conventional electromagnetic horn is generated by adding the frequency spectrum of the lower-pitched warning sound and the frequency spectrum of the higher-pitched warning sound.

Figure 6A:
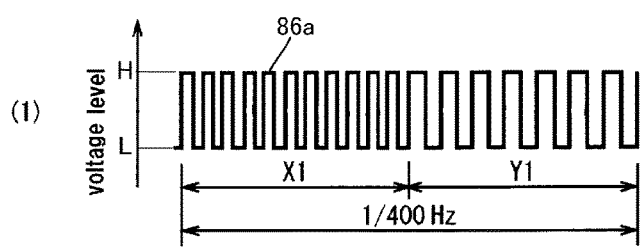
FIGS. 6A and 6B are waveform diagrams showing two output signals generated by frequency modulation circuits according to the present teachings.

In view of this information, according to a preferred embodiment of the present teachings, the frequency of the first fundamental square wave for the higher-pitched sound (which will be modulated) is set to 3200 Hz, the frequency of the first modulating square wave is set to 400 Hz, and the first frequency deviation is set to 400 Hz (absolute value). The first frequency deviation can also be expressed in decibels (dB) as $20 \log_{10}$ (frequency deviation/fundamental square wave frequency)=$20 \log_{10}$ (400/3200)=−18 dB. The reason why the first frequency deviation is set to −18 dB is that the tone quality of the resulting warning sound is appropriate, as will be further described below. The output signal 86a from the first frequency modulation/deviation circuit 83A in this preferred embodiment is shown in FIG. 6A. The waveform of the signal 86a is a square wave that alternates between high (H) and low (L), wherein the square wave has a frequency of 3600 Hz in region X1 and the square wave has a frequency of 2800 Hz in region Y1, i.e. the frequencies are respectively increased and decreased by 400 Hz relative to the frequency (3200 Hz) of the first fundamental square wave. Furthermore, the frequencies of regions X1 and Y1 alternately repeat with a period of 2.5 ms (=1/400 (Hz)).

Figure 6B:
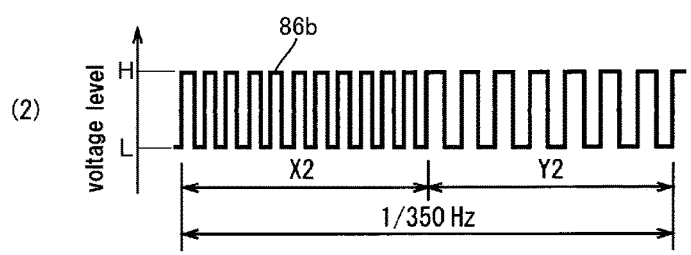

Further, the frequency of the second fundamental square wave for the lower-pitched sound (which will be modulated) is set to 2800 Hz, the frequency of the second modulating square wave is set to 350 Hz, and the second frequency deviation is set to 400 Hz (absolute value). The second frequency deviation also can be expressed in dB as $20 \log_{10}$ (frequency deviation/fundamental square wave frequency) =$20 \log_{10}$ (400/2800)=−17 dB. Similar to above, the reason why the second frequency deviation is set to −17 dB is that the tone quality of the warning sound is appropriate, as will be further described below. The output signal 86b from the second frequency modulation/deviation circuit 83B in this preferred embodiment is shown in FIG. 6B. The waveform of the signal 86b is also a square wave that alternates between high (H) and low (L). However, the square wave has a frequency of 3200 Hz in region X2 and the square wave has a frequency of 2400 Hz in region Y2, i.e. the frequencies are respectively increased and decreased by 400 Hz relative to the frequency 2800 Hz of the second fundamental square wave. Furthermore, the frequencies of regions X2 and Y2 alternately repeat with a period of 2.9 ms (=1/350 (Hz)).

Figure 7:
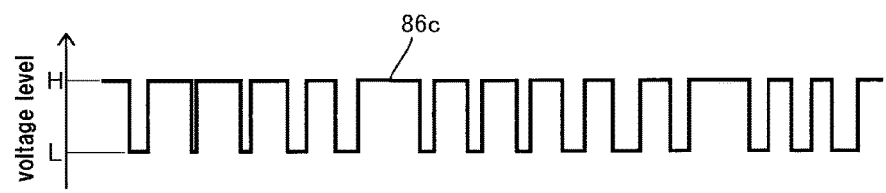
FIG. 7 is a waveform diagram of a composite signal generated by a mixing circuit according to the present teachings.

These two output signals 86a, 86b are then input into the mixing circuit 86, and are mixed (combined). FIG. 7 shows the waveform of the mixed or composite signal 86c after mixing (combining) in the mixing circuit 86. The mixing in the mixing circuit 86 in this case may be either an OR operation or an AND operation. For example, in the case of an OR operation, the composite (mixed) signal 86c is "L" only when both of the output signals 86a, 86b are "L", and the composite (mixed) signal 86c is "H" when one or both of the output signals 86a, 86b is (are) "H". The composite (mixed) signal 86c, i.e. as the drive voltage corresponding thereto, is output to the piezoelectric device 6 via the driver circuit 81.

The frequency spectrum of the warning sound to be generated from the diaphragm plate 4 excited by the piezoelectric device 6, to which the drive voltage is applied, is basically the same as the frequency spectrum (see FIG. 5) resulting from adding the frequency spectrum (see FIG. 3) of the warning sound to be output from the conventional planar electromagnetic vehicle horn for the lower-pitched sound and the frequency spectrum (see FIG. 4) of the warning sound to be output from the electromagnetic vehicle horn for the higher-pitched sound, and the tone quality (timbre) of the warning sound is greatly improved.

It should be noted that, with regard to the sound pressure, in case the diaphragm plate 4 is composed, e.g., of a steel plate, which is made according to a Japanese steel grade SUS (corresponding to SAE 300-series and 400-series steel grades) having a plate thickness of 0.3 mm and a diameter of φ64 mm, a piezoelectric device 6 having a plate thickness of 0.3 mm and a diameter of φ40 mm is used as the diaphragm, and the above drive voltage that alternates between high (H) and low (l) with an absolute value of 62.5 V is applied to the piezoelectric device 6, it is possible to obtain a sufficient sound pressure of about 110 dB when the drive frequency is near the resonance frequency of the diaphragm plate 4. It should be noted that the resonance frequency of the diaphragm plate 4 can be altered by changing the plate thickness and/or the outer diameter. Thus, the first and second fundamental frequencies are preferably selected in view of the resonance frequency of the diaphragm plate 4 that is used to generate the warning sound.

In order to assess warning sounds generated according to the present teachings, a sensory test was performed with five test subjects and the results are shown in Table 1 below. When the frequency of the fundamental square wave was set in the range of 1800 to 3550 Hz (the range in Table 1 for which single circles are indicated), a tone quality approximating (similar to) the tone quality of the warning sound output from a conventional planar electromagnetic horn was obtained; in particular, the range of 2000 to 3350 Hz was preferable (the range in Table 1 for which double circles are indicated). At 1600 Hz, the tone quality sometimes deviated from the tone quality of the planar electromagnetic horn, and at 1400 Hz or lower, a sufficient sound pressure was not obtained. Further, at 3750 Hz, a slightly higher piercing sound than the tone quality of the planar electromagnetic horn was obtained, and at 3950 Hz or higher, a high piercing sound was obtained.

TABLE 1

| | frequency of fundamental rectangular wave | | | | | | | | |
|---|---|---|---|---|---|---|---|---|---|
| | 1400 Hz | 1600 Hz | 1800 Hz | 2000 Hz | ... | 3350 Hz | 3550 Hz | 3750 Hz | 3950 Hz |
| evaluation A | X | Δ | ○ | ◎ | ◎ | ◎ | ○ | ○ | X |
| evaluation B | Δ | ○ | ○ | ◎ | ◎ | ◎ | ○ | ○ | X |
| evaluation C | X | ○ | ○ | ◎ | ◎ | ◎ | ○ | Δ | X |
| evaluation D | X | ○ | ○ | ◎ | ◎ | ◎ | ○ | Δ | X |
| evaluation E | X | Δ | ○ | ◎ | ◎ | ◎ | ○ | Δ | X |
| judgement | X | X | ○ | ◎ | ◎ | ◎ | ○ | X | X |

As shown in Table 2 below, when the frequency of the modulating square wave was set in the range of 290 to 580 Hz (the range in Table 2 for which single circles are indicated), a tone quality similar to the tone quality of the warning sound output from a conventional planar electromagnetic horn was obtained; in particular, the range of 310 to 440 Hz was preferable (the range in Table 2 for which double circles are indicated). At 270 Hz, a beat was sometimes perceived slightly, and at 250 Hz or lower, a beat was perceived. Further, at 600 Hz, a slightly monotone sound relative to the planar electromagnetic horn was obtained, and at 620 Hz or higher, a definite monotone sound was obtained.

TABLE 2

| | frequency of modulating rectangular wave | | | | | | | | |
|---|---|---|---|---|---|---|---|---|---|
| | 250 Hz | 270 Hz | 290 Hz | 310 Hz | ... | 440 Hz | 580 Hz | 600 Hz | 620 Hz |
| evaluation A | X | Δ | ○ | ⊚ | ⊚ | ⊚ | ○ | ○ | X |
| evaluation B | X | ○ | ○ | ⊚ | ⊚ | ⊚ | ○ | ○ | X |
| evaluation C | X | Δ | ○ | ⊚ | ⊚ | ⊚ | ○ | Δ | X |
| evaluation D | X | ○ | ○ | ⊚ | ⊚ | ⊚ | ○ | Δ | X |
| evaluation E | X | ○ | ○ | ⊚ | ⊚ | ⊚ | ○ | ○ | X |
| judgement | X | X | ○ | ⊚ | ⊚ | ⊚ | ○ | X | X |

As shown in Table 3 below, when the frequency deviation was set in a range of −11 to −25 dB, a tone quality approximating (similar to) the tone quality of the warning sound output from a conventional planar electromagnetic horn was obtained (the range in Table 3 for which single circles are indicated); in particular, the range of −15 to −21 dB was preferable (the range in Table 3 for which double circles are indicated). At −7 dB, the sound slightly split (cracked), and at −3 dB or less, the sound split (cracked). Further, at −29 dB, a slightly monotone sound relative to the planar electromagnetic horn was obtained, and at −33 dB or more, a sound similar to a monotone was obtained.

TABLE 3

| | frequency deviation | | | | | | | |
|---|---|---|---|---|---|---|---|---|
| | −3 db | −7 db | −11 db | −15 db | ... | −21 db | −25 db | −29 db | −33 db |
| evaluation A | X | Δ | ○ | ⊚ | ⊚ | ⊚ | ○ | ○ | X |
| evaluation B | X | ○ | ○ | ⊚ | ⊚ | ⊚ | ○ | ○ | X |
| evaluation C | X | X | ○ | ⊚ | ⊚ | ⊚ | ○ | Δ | X |
| evaluation D | X | ○ | ○ | ⊚ | ⊚ | ⊚ | ○ | Δ | X |
| evaluation E | X | Δ | ○ | ⊚ | ⊚ | ⊚ | ○ | Δ | X |
| judgement | X | X | ○ | ⊚ | ⊚ | ⊚ | ○ | X | X |

Although some aspects of the present teachings have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or structural feature of a corresponding device.

For example, in another aspect of the present teachings, a method for generating a composite signal, to be used to drive a piezoelectric device attached to a diaphragm, may include: generating a first fundamental square wave and a second fundamental square wave different from the first fundamental square wave, modulating the first fundamental square wave with a first modulating square wave, modulating the second fundamental square wave with a second modulating square wave, and mixing the resulting modulated waves to generate the composite wave. This method also serves as an algorithm for preparing a program that can be executed on a processor, as will be further described below.

Depending on the particular implementation requirements, exemplary embodiments of the circuit board 3 may be implemented in hardware and/or in software. For example, in digital implementations of the present teachings, the circuit board 3 or processor may be implemented with a digital storage medium, for example a floppy disk, a DVD, a Blu-Ray disc, a CD, a ROM, a PROM, an EPROM, an EEPROM or a flash memory, a hard drive or another magnetic or optical storage device, on which electronically readable control signals are stored, which interact or can interact with a programmable hardware component such that the respective method is performed.

The programmable hardware component may comprise a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FGPA), e.g., including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the circuit board 3 may be implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier. The program code or the data can be, among other things, source code, machine code, bytecode or another intermediate code.

A further exemplary embodiment is a data stream, a signal sequence, or a sequence of signals which represents the program for performing one of the methods described herein. The data stream, the signal sequence, or the sequence of signals can for example be configured to be transferred via a data communications connection, for example via the Internet or another network. Exemplary embodiments are thus also signal sequences that represent data, which are intended for transmission via a network or a data communications connection, wherein the data represent the program.

A program according to an exemplary embodiment can implement one of the methods during its performance, for example, such that the program reads storage (memory) locations or writes one or more data elements into these storage (memory) locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage (memory) location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the motors and actuators described herein.

In addition or in the alternative, square waves, such as the fundamental square waves and/or the modulating square waves, may be implemented on an integrated circuit or with one or more discrete components. Square waveforms (square pulses) may be generated in a variety of ways and the present teachings are not particularly limited in this regard. For example, square waveforms (pulses) may be generated, e.g., by a relaxation oscillator, voltage controlled oscillator (VCO), a Schmitt trigger, etc.

The first fundamental square wave can be modulated with the first modulating square wave using any suitable technique or FM modulating circuitry in the frequency modulating ("FM") field for modulating a first (fundamental) square wave with a second (modulating) square wave, e.g., by digital baseband modulation circuits, line coding circuits, frequency shift key ("FSK") circuits, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods and apparatus for generating a warning sound for a vehicle.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

The invention claimed is:

1. An electronic vehicle horn that outputs a warning sound by exciting a diaphragm using a piezoelectric device, the electronic vehicle horn comprising:
   means for generating a first fundamental square wave for a higher-pitched sound;
   means for generating a second fundamental square wave for a lower-pitched sound;
   means for generating a first modulating square wave;
   means for generating a second modulating square wave;
   means for modulating the first fundamental square wave with the first modulating square wave and for setting a first frequency deviation at the time of the modulation to generate a modulated first fundamental square wave;
   means for modulating the second fundamental square wave with the second modulating square wave and for setting a second frequency deviation at the time of the modulation to generate a modulated second fundamental square wave; and
   means for generating a composite signal and for driving the piezoelectric device with the composite signal, the composite signal resulting from mixing the modulated first fundamental square wave and the modulated second fundamental square wave,
   wherein each of the fundamental square waves are within a first frequency range, each of the modulating square waves are within a second frequency range and the frequency deviations, relative to the frequencies of the fundamental square waves, are within a decibel range such that the warning sound output by the piezoelectric device driven with the composite signal is similar to a tone quality of a warning sound that is output from an electromagnetic horn.

2. The electronic vehicle horn according to claim 1, wherein the first frequency range is between 1800 Hz and 3550 Hz.

3. The electronic vehicle horn according to claim 2, wherein the first frequency range is between 2000 Hz and 3350 Hz.

4. The electronic vehicle horn according to claim 1, wherein the second frequency range is between 290 Hz and 580 Hz.

5. The electronic vehicle horn according to claim 4, wherein the second frequency range is between 310 Hz and 440 Hz.

6. The electronic vehicle horn according to claim 1, wherein the decibel range of the frequency deviations relative to the frequencies of the fundamental square waves is between −11 dB and −25 dB.

7. The electronic vehicle horn according to claim 6, wherein the decibel range of the frequency deviations relative to the frequencies of the fundamental square waves is between −15 dB and −21 dB.

8. The electronic vehicle horn according to claim 7, wherein the first frequency range is between 2000 Hz and 3350 Hz.

9. The electronic vehicle horn according to claim 8, wherein the second frequency range is between 310 Hz and 440 Hz.

10. The electronic vehicle horn according to claim 1, wherein the first fundamental square wave is 3200 Hz, the second fundamental square wave is 2800 Hz, the first modulating square wave is 400 Hz, the second modulating square wave is 350 Hz, the first frequency deviation is −18 dB, the second frequency deviation is −17 dB and the diaphragm is a steel plate having a diameter of 64 millimeters and a thickness of 0.3 millimeters.

11. An electronic vehicle horn comprising:
a diaphragm,
a piezoelectric device configured to excite the diaphragm so as to emit a warning sound,
a circuit that generates a first fundamental square wave and a second fundamental square wave, the first fundamental square wave having a higher frequency than the second fundamental square wave;
a circuit that generates a first modulating square wave and a second modulating square wave;
a modulating circuit that modulates the first fundamental square wave with the first modulating square wave and that sets a first frequency deviation, relative to the first fundamental square wave, at the time of the modulation to generate a modulated first fundamental square wave;
a modulating circuit that modulates the second fundamental square wave with the second modulating square wave and that sets a second frequency deviation, relative to the second fundamental square wave, at the time of the modulation to generate a modulated second fundamental square wave;
a mixing circuit that mixes the modulated first fundamental square wave and the modulated second fundamental square wave to generate a composite signal; and
a driver circuit that drives the piezoelectric device with the composite signal.

12. The electronic vehicle horn according to claim 11, wherein the first and second fundamental square waves are each between 1800 Hz and 3550 Hz.

13. The electronic vehicle horn according to claim 12, wherein the first and second fundamental square waves are each between 2000 Hz and 3350 Hz.

14. The electronic vehicle horn according to claim 11, wherein the first and second modulating square waves are each between 290 Hz and 580 Hz.

15. The electronic vehicle horn according to claim 14, wherein the first and second modulating square waves are each between 310 Hz and 440 Hz.

16. The electronic vehicle horn according to claim 11, wherein the first and second frequency deviations relative to the frequencies of the first and second fundamental square waves, respectively, are each within a decibel range between −11 dB and −25 dB.

17. The electronic vehicle horn according to claim 16, wherein the decibel range is between −15 dB and −21 dB.

18. The electronic vehicle horn according to claim 17, wherein the first and second fundamental square waves are each between 2000 Hz and 3350 Hz.

19. The electronic vehicle horn according to claim 18, wherein the first and second modulating square waves are each between 310 Hz and 440 Hz.

20. The electronic vehicle horn according to claim 11, wherein the first fundamental square wave is 3200 Hz, the second fundamental square wave is 2800 Hz, the first modulating square wave is 400 Hz, the second modulating square wave is 350 Hz, the first frequency deviation is −18 dB, the second frequency deviation is −17 dB and the diaphragm is a steel plate having a diameter of 64 millimeters and a thickness of 0.3 millimeters.

* * * * *